United States Patent Office 3,485,831
Patented Dec. 23, 1969

3,485,831
V-TRIAZOLYL-SUBSTITUTED STILBENES
Alfons Dorlars and Otto Neuner, Leverkusen, and Rolf Putter, Dusseldorf, Germany, assignors to Farbenfabriken Bayer Aktiengesellschaft, Leverkusen, Germany, a corporation of Germany
No Drawing. Continuation-in-part of application Ser. No. 550,610, May 17, 1966. This application June 5, 1967, Ser. No. 643,381
Claims priority, application Germany, May 20, 1965, F 46,099
Int. Cl. C07d 55/02
U.S. Cl. 260—240        8 Claims

ABSTRACT OF THE DISCLOSURE

Symmetrical and unsymmetrical v-triazolyl-(2)-stilbene having utility as brightening agents.

---

This is a continuation-in-part of Ser. No. 550,610 filed on May 17, 1966, now abandoned.

The present invention relates to brightening agents; more particularly it concerns brightening agents which contain, as the active component, blue-fluorescent v-triazolyl-(2)-stilbene compounds of the formula

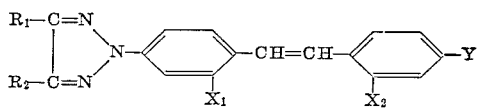

in which $R_1$ stands for hydrogen or an optionally substituted alkyl or aryl radical and $R_2$ for an optionally substituted alkyl or aryl radical, or in which $R_1$ and $R_2$ together with the two carbon atoms of the triazole ring form a non-aromatic ring system, while $X_1$ and $X_2$, independently of one another, denote hydrogen, a sulphonic acid group, a sulphonic acid ester group, an optionally substituted sulphonic acid amide group, an alkylsulphone or arylsulphone group, a carboxylic acid group, a carboxylic acid ester group, an optionally substituted carboxylic acid amide group or cyano, and Y stands for hydrogen, an acylated amino group or an optionally substituted v-triazolyl or pyrazolyl group.

The brightening agents of the present invention are suitable for the brightening of a great variety of materials, for example of cellulose materials such as cotton and paper, or of wool, and also of synthetic materials, such as fibres, filaments, foils or plastic materials made of polyamides, polyesters, polyacrylonitrile, polyvinyl chloride and cellulose acetates, and also for the brightening of lacquers made of cellulose acetates or for the brightening of soap. For brightening cotton and synthetic polyamides those v-triazolyl-(2)-stilbene compounds corresponding to the above formula are chiefly suitable, in which Y stands for an optionally substituted v-triazolyl-(2) or pyrazolyl-(1) radical and $X_1$ as well as $X_2$ denote a sulphonic acid group, whereas those compounds which correspond to the above formula but are free from sulphonic acid groups are mainly suitable for brightening materials of polyesters, polyvinyl chloride and cellulose acetates and for the brightening of lacquers made of cellulose acetates.

The brightening agents can be applied in the usual manner, for example in the form of aqueous solutions or dispersions or in the form of solutions in organic solvents, such as ethylene glycol monomethyl ether, dimethyl formamide and triethanolamine. If desired, the brightening agents can also be used in combination with detergents or they can be added to moulding materials serving for the production of foils or filaments. The necessary amounts can easily be determined in each case by preliminary experiments; in general, amounts of 0.1 to 1%, referred to the material to be brightened, have proved to be sufficient.

Those brightening agents according to the invention, which have a symmetrical structure can be obtained, for example, by condensing stilbene compounds of the formula

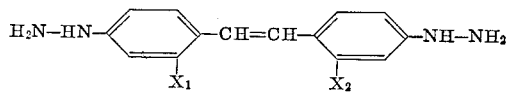

in which $X_1$ and $X_2$ have the same meaning as above, by known methods with α-oximino-ketones of the formulae

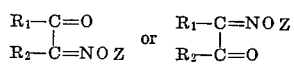

in which $R_1$ and $R_2$ have the same meaning as above and Z denotes hydrogen or an acyl group, converting the resultant bis-α-oximino-hydrazones into the symmetrical bis-[triazolyl-(2)]-stilbene compounds with the splitting off of HOZ, and provided that $R_1$ and/or $R_2$ are aryl radicals, introducing substituents, for example the sulphonic acid group, into these radicals, if desired. Brightening agents according to the invention, which have an asymmetrical structure can be obtained, for example, by condensing the amino group in stilbene compounds of the formula

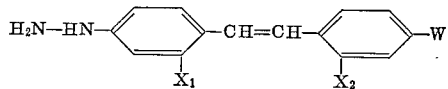

in which $X_1$ and $X_2$ have the same meaning as above, while W stands for a group which can be converted into a free amino group, e.g. for a nitro or acylated amino group, according to known methods with α-oximino-ketones of the above formulae, converting the resultant α-oximino-hydrazones into the triazolyl-(2)-stilbene compounds with the splitting off of HOZ, and then transforming the substituent W into the substituent Y which has the same meaning as above.

The brightening agents of the present invention are surprisingly fast to light and chlorine.

The following examples serve to illustrate the invention without, however, limiting its scope.

EXAMPLE 1

An unbleached cotton fabric is treated in a liquor ratio of 1:20 and at 40–50° C. for 30 minutes in an aqueous bath containing, per litre, 0.06 g. of the brightening agent of the formula

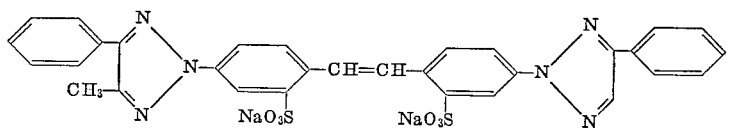

The fabric is subsequently rinsed and dried. It then shows a clear neutral brightening effect of good fastness to chlorine and excellent fastness to light.

The brightening agent employed is prepared in the following manner: 400 g. 4,4'-dihydrazino-stilbene-2,2'-disulphonic acid (1 mol) are stirred in 5 litres water with the addition of 25 ml. of a technical sodium bisulphite solution. The mixture is adjusted to a pH value of 6.0 to 6.5 by the dropwise addition of a concentrated sodium hydroxide solution, a clear solution being thus obtained. A solution of 391 g. α-oximino-propiophenone (2.4 mol) in 5 litres methanol is added thereto at 40° C. while stirring. The reaction mixture is slowly heated to boiling temperature while cooling under reflux and at the same time adjusting a pH value of 4.2 to 4.5 by the dropwise addition of acetic acid. As soon as a spot test with o-naphthoquinone-sulphonic acid no longer shows free hydrazine, thus indicating that the condensation is completed, the bulk of the methanol is distilled off under reduced pressure; the reaction mixture is then cooled to room temperature, mixed with 250 g. sodium chloride and acidified with concentrated hydrochloric acid. The bis-(oximino-propiophenone)-stilbene-hydrazone-disulphonic acid which separates in the form of red crystals is filtered off with suction, washed with a dilute sodium chloride solution and dried in a vacuum at 40° C. 650 grams of this compound are introduced at room temperature with stirring into a mixture of 3.5 litres acetic anhydride, 50 g. sodium acetate and 100 ml. dimethyl formamide. The temperature of the reaction mixture is gradually raised to 105° C. within 2 hours and stirred at this temperature for a further 8 hours. The reaction mixture is subsequently concentrated in a vacuum to about half its volume and then cooled. The precipitating crude 4,4' - bis-[4-phenyl-5-methyl-triazolyl-(2)]-stilbene-2,2'-disulphonic acid is filtered off with suction and converted into the sodium salt by stirring it with an aqueous sodium hydroxide solution; this salt is then purified by reprecipitating it several times from 50% aqueous alcohol; after drying, it is obtained in the form of a pale greenish-yellow powder.

EXAMPLE 2

Unbleached cotton yarn is treated in a liquor ratio of 1:20 and at 85 to 95° C. for one hour in an aqueous bath containing, per litre, 0.08 g. of one of the brightening agents mentioned below under (a) to (p) and 2 g. sodium chlorite. After rinsing and drying, the yarn thus treated shows a very clear brightening effect of excellent fastness to light.

The brightening agents concerned are compounds corresponding to the formula

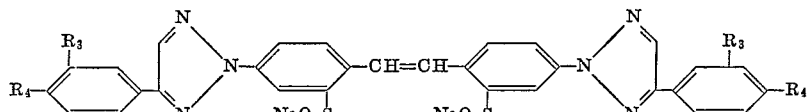

in which the substituents $R_3$ and $R_4$ have the meaning given in the table below.

| | $R_3$ | $R_4$ |
|---|---|---|
| a | H | H |
| b | H | Cl |
| c | H | OCH$_3$ |
| d | H | CH$_3$ |
| e | SO$_3$Na | CH$_3$ |
| f | H | SO$_3$Na |
| g | SO$_3$Na | OCH$_3$ |
| h | SO$_3$Na | OC$_4$H$_9$ |
| i | SO$_3$Na | C$_4$H$_9$ |
| k | H | F |
| l | Cl | H |
| m | H | OC$_2$H$_5$ |
| n | CH$_3$ | OCH$_3$ |
| o | H | O—CH$_2$—COOH |
| p | CH$_3$ | O—CH$_2$—COOH |

The free acids from which the brightening agents (a), (b), (c), (d), (k), (l), (m) and (n) are derived, are prepared by condensation of 4,4'-dihydrazino-stilbene-2,2'-disulphonic acid with (a) oximino-acetophenone, (b) 4-fluoro-oximino-acetophenone, (1) 3-chloro-oximino-acetophenone, (d) 4-methyl-oximino-acetophenone, (k) 4-fluoro-oximino-acetophenone, (1) 3-chloro-oxamino-acetophenone, (m) 4-ethoxy-oximino-acetophenone and (n) 3-methyl-4-methoxy oximino-acetophenone, respectively, and ring closure of the resultant bis-α-oximino-hydrazones to form the corresponding bis-triazoles. The tetrasulphonic acids from which the brightening agents (e), (f) and (g) are derived are obtained by sulphonation of the brightening agents specified under (d), (a) and (c), respectively, with concentrated sulphuric acid; the free acids from which the brightening agents (h) and (i) are derived, are prepared by condensation of 4,4'-dihydrazinostilbene-2,2'-disulphonic acid with (h) 4-butoxy-oximino-acetophenone or (i) 4-butyl-oximino-acetophenone, ring closure of the resultant bis-α-oximino-hydrazones to form the corresponding bis-triazoles and sulphonation with concentrated sulphuric acid. The brightening agents (o) and (p) are prepared by splitting the ether groups in the compounds (c) or (n) with pyridine hydrochloride at 190° C., reacting the resultant 4,4'-bis-[4-(4'-hydroxyphenyl)-triazolyl - (2)] - stilbene - 2,2' - disulphonic acid or 4,4'-bis-[4-(4'-hydroxy-3'-methylphenyl)-triazolyl-(2)]-stilbene-2,2'-disulphonic acid with chloroacetic acid in a soda alkaline solution at pH 10.0 to 10.5 and isolating the reaction products by salting out at pH 4.

EXAMPLE 3

Unbleached cotton yarn is treated at 60° C. in a liquor ratio of 1:20 for one hour in an aqueous bath containing, per litre, 0.08 g. of the sodium salt of 4,4'-bis-[4-(phenyl-4'-sulphonic acid)-5-methyl-triazolyl-(2)] - stilbene - 2,2'-disulphonic acid of the formula

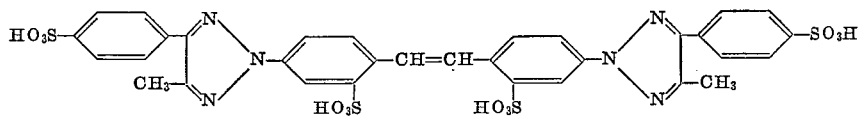

and an amount of sodium hypochlorite corresponding to 2 g. active chlorine. A clear brightening effect of excellent fastness to light is thus obtained.

The tetrasulphonic acid from which the brightening agent used is derived is obtained by sulphonation of the compound described in Example 1 with concentrated sulphuric acid at 60–80° C.

Similar clear brightening effects which are fast to light are obtained by using the compounds specified in Example 2 under (a) to (p) instead of the brightening agent employed above.

EXAMPLE 4

1 kilogram grain soap is mixed with 1 g. of the brightening agent of the formula

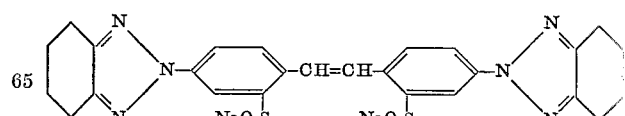

to form a homogeneous mass. The soap thus treated has a substantially whiter appearance in daylight than the untreated soap.

The free acid from which the brightening agent employed is derived is prepared by condensation of 1 mol 4,4'-dihydrazino-stilbene-2,2'-disulphonic acid with 2.4 mol cyclohexane-1,2-dione-monoxime and dehydration of the bis-α-oximino-hydrazone.

Similar results are obtained by using as brightening agent the sodium salt of the compound of the formula

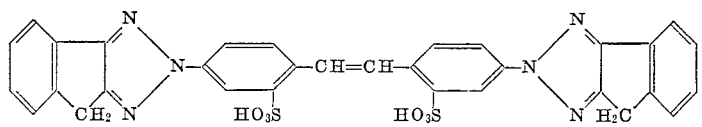

the sodium salt of 4,4'-bis-[4,5-dimethyltriazolyl-(2)]-stilbene-2,2'-disulphonic acid or the sodium salt of 4,4'-bis-[4-methyl - 5 - isopropyl-triazolyl-(2)]-stilbene-2,2'-disulphonic acid which can be obtained in an analogous manner by dehydrating the condensation product of 4,4'-dihydrazino-stilbene-2,2'-disulphonic acid and 2-oximino-indanone-(1), diacetyl-monoxime or 4-methyl-3-oximino-pentanone-(2).

Brightening effects are also obtained by using, as brightening agent, the sodium salt of 4-[4-penyltriazolyl-(2)]-stilbene-2-sulphonic acid or the sodium salt of 4-[4-p-ethoxyphenyltriazolyl-(2)]-stilbene - 2 - sulphonic acid. These brightening agents are prepared by condensation of 4-hydrazino-stilbene-2-sulphonic acid with oximino acetophenone or with 4-ethoxy-oximino-acetophenone and dehydrating the resultant α-oximinohydrazones.

EXAMPLE 5

White laundry goods are washed in a liquor ratio of 1:20 and at 90 to 100° C. in a liquor containing, per liter, 10 g. of a commercial anion-active detergent and 0.1 g. of one of the following brightening agents (a) to (f). After rinsing and drying, the laundry goods thus treated are excellently brightened.

The brightening agents concerned are compounds corresponding to the formula

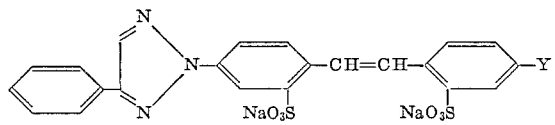

in which the substituent Y has the meaning given in the table below:

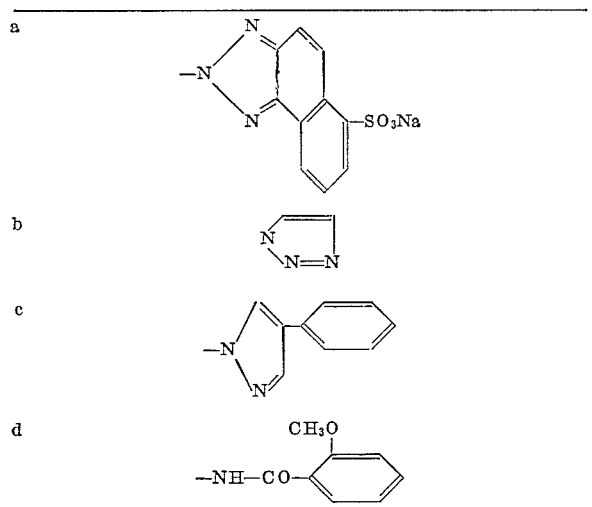

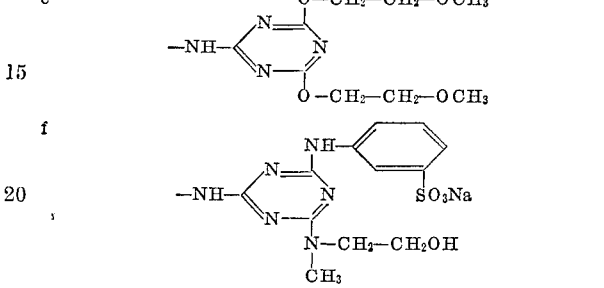

The brightening agent (a) is prepared as follows: 415 g. 4-nitro-4'-hydrazino-stilbene-2,2'-disulphonic acid (1 mol) are condensed in the manner described in Example 1 with 179 g. oximino-acetophenone (1.2 mol) in 50% methanol, and the resultant nitro-hydrazone is converted into the corresponding triazole compound by means of acetic anhydride. The nitro group is then reduced in an aqueous acetic acid suspension by means of iron turnings to form the amino group and the resultant 4-amino-4'-[4-phenyl-triazolyl-(2)]-stilbene-2,2'-disulphonic acid is diazotised at +15° C. in an aqueous hydrochloric acid suspension. The suspension of the diazo compound is combined in a neutral to weakly alkaline reaction with a solution of 2-naphthylamino-5-sulphonic acid and the azo dyestuff which has formed when the coupling is completed, is oxidised with an ammoniacal copper sulphate solution to form the naphtho-triazole. After repeated redissolving in water with the addition of sodium carbonate and after drying, the compound of the above formula is obtained in the form of a pale slightly yellow powder.

The brightening agent (b) is prepared in the following manner: 4-[triazolyl-(1)]-4'-aminostilbene - 2,2' - disulphonic acid is diazotised, the resultant diazo compound is reduced with sodium sulphite, the resultant hydrazine compound is condensed with oximino-acetophenone and the resultant α-oximino hydrazone is dehydrated to form the triazolyl-(2)-compound.

The brightening agent (c) is prepared by condensation of 4 - hydrazino-4'-[4-phenyltriazolyl-(2)-]-stilbene-2,2'-disulphonic acid which is obtained from 4-amino-4'-[4-phenyltriazolyl-(2)]-stilbene, 2,2'-disulphonic acid by diazotising and reducing the resultant diazo compound with sodium sulphite, with phenyl malondialdehyde.

The brightening agents (d) to (f) are prepared by acylating 4-amino-4'-[4-phenyltriazolyl-(2)]-stilbene-2,2'-disulfonic acid (d) with anisoylchloride, (e) with 2-chloro-4,6-bis-[methoxyethoxy]-2,3,5-triazine or (f) with N - [4,6 - dichloro-1,3,5-triazinyl-(2)]-aniline-3-sulphonic acid with subsequent reaction of the ultimately obtained acylation product with methyl-ethanolamine.

A very good brightening effect is also obtained by using, instead of one of the aforesaid brightening agents (a) to (f), the compound of the formula

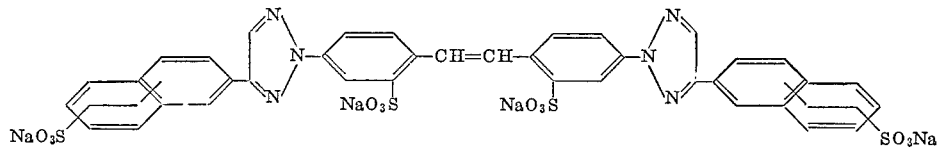

This brightening agent is prepared in the following manner: 4,4'-dihydrazinostilbene-2,2'-disulphonic acid is condensed with oximino-β-acetonaphthone, and the resultant bis-α-oximinohydrazone is dehydrated to form the bis-triazolyl-(2)-compound; this compound is then sulphonated with concentrated sulphuric acid and the resultant tetrasulphonic acid is converted into the sodium salt with sodium carbonate.

EXAMPLE 6

A fabric of fibres which have been produced from poly-ε-caprolactam is treated in a liquor ratio of 1:40 and at 80 to 90° C. for 30 minutes in an aqueous bath containing, per litre, 0.2 g. of one of the brightening agents specified below under (a) to (q). After rinsing and drying, the fabric exhibits a strong, very clear brightening effect of excellent fastness to light and chlorite.

The brightening agents concerned are compounds corresponding to the formula

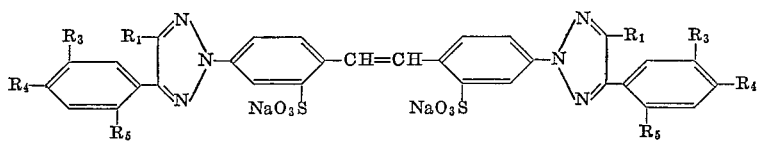

in which the substituents $R_1$, $R_3$, $R_4$ and $R_5$ have the meaning given in the table below. They are prepared according to the instructions of Example 1. The right hand column of the table states the α-oximino-ketone with which the 4,4'-dihydrazino-stibene-2,2'-disulphonic acid is condensed. The brightening agents (c) and (l) are prepared by treating the brightening agents (b) and (k) respectively with concentrated sulphuric acid and subsequently converting them into the sodium salts. The α-aryl-α-oximino-acetone compounds employed can be obtained by arylation of oximino-acetone according to Borsche by the modified method C. Philipp (Annalen der Chemie, volume 523 [1936], page 285).

EXAMPLE 7

A fabric of fibres which are produced from a hexamethylene-diamine-adipic acid polymer is treated at 90–95° C. in a liquor ratio of 1:40 for 30 minutes in a bath containing, per litre, 0.2 g. of one of the brightening agents specified in Example 2 under (a) to (p), or in Example 6 under (a) to (o) and 2 g. sodium chloride. After rinsing and drying, the fabric exhibits a very clear brightening effect of excellent fastness to light.

EXAMPLE 8

A polyamide fabric of yellowish appearance is washed in usual manner with a combination of detergents suitable for fine laundry goods, which contains 0.2% by weight of the brightening agent of the formula

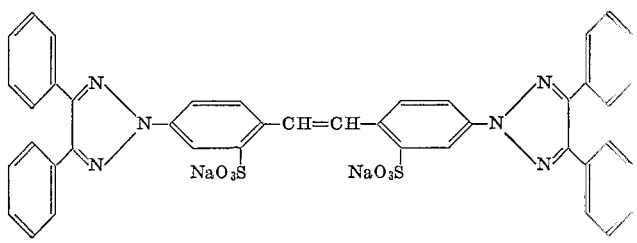

The washed fabric shows a very clear brightening effect of excellent fastness to light.

The brightening agent employed is prepared in the following manner: 4,4'-dihydrazino-stilbene-2,2'-disulphonic acid is condensed with benzilmonoxime and the resultant bis-α-oximino-hydrazone is dehydrated to form the bis-triazolyl-(2)-compound; this compound is then isolated in form of the sodium salt.

EXAMPLE 9

A mixture of 900 g. ε-caprolactam, 100 g. ε-aminocaproic acid, 0.5 g. acetic acid, 13.5 g. titanium dioxide and 4 g. of one of the following brightening agents (a) to (k) is heated in a container of stainless steel to 260° C. for 5 hours under atmospheric pressure. The resultant polyamide melt is worked up in usual manner to chips and the chips are spun into filaments of 90/25 denier. The resultant filaments exhibit brightening effects of excellent fastness to light and wet processing.

|   | $R_1$ | $R_3$ | $R_4$ | $R_5$ | Oximino ketone employed |
|---|---|---|---|---|---|
| a | H | H | $C_2H_5$ | H | 4-ethyl-oximino acetophenone. |
| b | H | H | $CH_3$ | $CH_3$ | 2,4-dimethyl-oximino acetophenone. |
| c | H | $SO_3Na$ | $CH_3$ | $CH_3$ | 2,4-dimethyl-oximino acetophenone. |
| d | $CH_3$ | H | H | H | α-Phenyl-α-oximino acetone. |
| e | $CH_3$ | H | F | H | α-(4-fluorophenyl)-α-oximino-acetone. |
| f | $CH_3$ | H | Cl | H | α-(4-chlorophenyl)-α-oximino-acetone. |
| g | $CH_3$ | H | H | Cl | α-(2-chlorophenyl)-α-oximino-acetone. |
| h | $CH_3$ | H | $OCH_3$ | H | 4-methoxy-oximino propiophenone. |
| i | $CH_3$ | H | H | $OCH_3$ | α-(2-methoxyphenyl)-α-oximino-acetone. |
| k | $CH_3$ | H | $CH_3$ | H | α-(4-tolyl)-α-oximinoacetone. |
| l | $CH_3$ | $SO_3Na$ | $CH_3$ | H | α-(4-tolyl)-α-oximino-acetone. |
| m | H | H | H | $OCH_3$ | 2-methoxy-oximino acetophenone. |
| n | $CH_3$ | COOH | H | H | α-(3-carboxymethyl-phenyl)-α-oximino-acetone. |
| o | $CH_3$ | $OCH_3$ | H | H | α-(3-methoxyphenyl)-α-oximino-acetone. |
| p | $C_2H_5$ | H | H | H | α-Oximino-butyrophenone. |
| q | $C_4H_9$ | H | H | H | α-Oximino-caprophenone. |

Similar clear brightening effects which are fast to light and chlorine are obtained by using, instead of one of the abovesaid brightening agents, one of the brightening agents specified in Example 2 under (a) to (p).

The brightening agents concerned are compounds corresponding to the formula

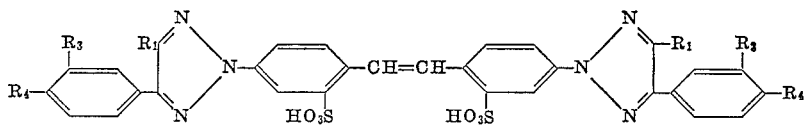

in which the substituents $R_1$, $R_3$ and $R_4$ have the meaning given in the table below.

|   | $R_1$ | $R_3$ | $R_4$ |
|---|---|---|---|
| a | H | H | COOH |
| b | H | H | O—$CH_2$—COOH |
| c | $CH_3$ | COOH | H |
| d | $CH_3$ | H | COOH |
| e | $CH_3$ | O—$CH_2$—COOH | H |
| f | $CH_3$ | H | O—$CH_2$—COOH |
| g | $CH_2$—$CH_2$—COOH | H | H |
| h | $CH_2$—$CH_2$—COOH | H | $CH_3$ |
| i | $C_6H_5$ | H | H |
| k | $CH_3$ | H | $C_6H_5$ |

The brightening agent (a) is prepared in the following manner: 1 mol of the sodium salt of 4,4'-bis-/-4-phenyl-triazolyl-(2)/-stilbene-2,2'-disulphonic acid described in Example 2 as brightening agent (a), is suspended in 96% sulphuric acid and nitrated while stirring at room temperature by gradual addition of 2 mols potassium nitrate and subsequently slowly heating the mixture to 50–60° C. The resultant 4,4'-bis-[4-p-nitrophenyl-triazolyl-(2)]-stilbene-2,2'-disulphonic acid is precipitated with water, then filtered off and converted into the disodium salt. The dinitro compound is subsequently dissolved in dimethyl formamide and catalytically reduced to the corresponding diamine in the presence of Raney nickel. After filtering off the catalyst with suction the diamine is isolated by diluting the filtrate with water and filtering off the resultant precipitate, and diazotised in the presence of sulphuric acid. From the diazonium salt thus obtained there is produced with copper-I-cyanide according to Sandmeyer 4,4'-bis-[4-p-cyanophenyl-triazolyl - (2)] - stilbene-2,2'-disulphonic acid and this bis-p-cyanophenyl-compound is converted into the corresponding bis-p-carboxyphenyl-compound by heating to 140° C. for several hours in 72% sulphuric acid. This compound is completely precipitated by addition of water, then filtered off and dissolved in a hot aqueous sodium carbonate solution, subsequently heated for purification first with sodium dithionite and then with sodium hypochlorite, salted out, repeatedly redissolved in water, finally precipitated in the form of the free acid by acidifying with hydrochloric acid and then dried.

The brightening agents (b), (c) and (i) are prepared by converting the brightening agent (o) of Example 2, the brightening agent (n) of Example 6 and the brightening agent of Example 8 into their free acids.

The brightening agents (d), (g), (h) and (k) are prepared by condensation of 4,4'-dihydrazino-stilbene-2,2'-disulphonic acid with (d) α-(4-carboxymethyl-phenyl)-α-oximinoacetone, (g) γ-benzoyl-γ-oximino-butyric acid, (h) γ-p-toluyl-γ-oximino-butyric acid or (k) α-oximinoethyl-diphenylketone and dehydration of the resultant bis-α-oximinohydrazones to the bis-triazoles; in the condensation with (d), the carboxylic acid methyl ester group is finally saponified to the carboxylic acid group.

The brightening agents (e) and (f) are prepared in the following manner: 4,4'-dihydrazino-stilbene-2,2'-sulphonic acid is condensed with α-(3- or 4-methoxyphenyl)-α-oximinoacetone, the resultant bis-α-oximinohydrazones are dehydrated to the corresponding bis-triazoles; the methoxy groups are then split by heating in pyridine hydrochloride, and the resultant 4,4'-bis-[4(3- or 4-hydroxyphenyl)-5-methyl-triazolyl-(2)]-stilbene - 2,2' - disulphonic acid is reacted with chloroacetone acid.

EXAMPLE 10

65 parts by weight of a polyvinylchloride of the K-value 72–74, prepared by emulsion polymerisation, 35 parts by weight of dioctylphthalate, 2 parts by weight of a commercial organic tin-containing stabiliser, 1 part by weight of titanium dioxide (rutile) and 0.1 part by weight of one of the brightening agents specified in the table below under (a) to (u) are rolled on a hot roller of low friction at 165° C. for about 5 minutes at a differently wide clearance between the rolls and the resultant sheet is removed from a four-roller equipment in form of a foil of a thickness of about 300/μ. The foil exhibits a strong brightening effect.

The brightening agents concerned are compounds corresponding to the formula

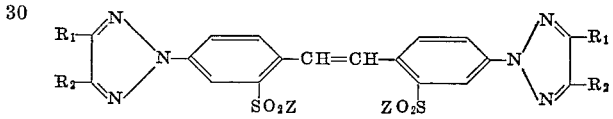

in which the substitutents $R_1$, $R_2$ and Z have the meaning indicated in the table below.

|   | $R_1$ | $R_2$ | Z |
|---|---|---|---|
| a | $CH_3$ | $CH_3$ | NH—$C_2H_5$ |
| b | $CH_3$ | $CH_3$ | N($CH_3$)$_2$ |
| c | $CH_3$ | $CH_3$ | NH—$CH_2$—$CH_2$—O$CH_3$ |
| d | $CH_3$ | $CH_3$ | NH—($CH_2$)$_3$—COOH |
| e | $CH_3$ | $CH_3$ | N($C_3H_7$)$_2$ |
| f | $CH_3$ | $CH_3$ | NH—⟨phenyl-H⟩ |
| g | $CH_3$ | $CH_3$ | N⟨morpholino⟩O |
| h | $CH_3$ | $CH_3$ | O—⟨phenyl⟩ |
| i | $CH_3$ | $CH_3$ | O—⟨phenyl-$CH_3$⟩ |
| k | $CH_3$ | i-$C_3H_7$ | N($C_2H_5$)$_2$ |
| l | $CH_3$ | i-$C_3H_7$ | NH—$C_4H_9$ |
| m | $CH_3$ | i-$C_3H_7$ | NH—$C_{12}H_{25}$ |
| o | $CH_3$ | i-$C_3H_7$ | O—⟨phenyl⟩—C($CH_3$)$_3$ |
| p | H | $C_6H_5$ | NH—$C_2H_5$ |
| q | H | $C_6H_5$ | N($C_2H_5$)$_2$ |
| r | H | $C_6H_5$ | NH—⟨phenyl-H⟩ |
| s | H | $C_6H_5$ | NH-i-$C_3H_7$ |
| t | H | $C_6H_5$ | NH—$C_4H_9$ |
| u | H | $C_6H_5$ | O—⟨phenyl-Cl⟩ |

The brightening agent (a) is prepared in the following manner: 574.5 g. (1 mol) of the sodium salt of 4,4'-bis-[4,5-dimethyl-triazolyl-(2)]-stilbene-2,2'-disulphonic acid as described in the third paragraph of Example 4 is introduced into a mixture of 3 l. phosphorus oxychloride and 400 g. of phosphorus pentachloride. The mixture is then gradually heated while stirring until the phosphorus oxychloride begins to boil and stirred at this temperature for a further 4 hours. After the evolution of hydrogen chloride has stopped, the phosphorus oxychloride is distilled off under reduced pressure and the residue is stirred with cold water. The resultant 4,4'-bis-[4,5-dimethyl-triazolyl-(2)]-stilbene-2,2'-disulphochloride is filtered off with suction, washed with ice water until acid free and stirred at 40° C. for about 4 hours with an excess aqueous ethyl-amine solution. The resultant crude bis-sulphoethylamide is filtered off with suction, washed with water, recrystallised from dimethyl formamide and then dried.

The brightening agents (a) to (u) are prepared by reacting (b) to (i) 4,4'-bis-(4,5-dimethyltriazolyl-(2)[-stilbene-2,2'-disulphochloride, (k) to (o) 4,4'-bis-[4-methyl-5-isopropyl-triazolyl-(2)]-stilbene-2,2' - disulphochloride or (p) to (u) 4,4'-bis-[4-phenyltriazolyl-(2)]-stilbene-2,2'-disulphochloride with the corresponding amine or alkaline phenolate. The disulphochlorides specified at the last and penultimate last place are prepared from the sodium salt of 4,4'-bis[4-methyl-5-isopropyl-triazolyl-(2)]-stilbene-2,2'-disulphonic acid described in the third paragraph of Example 4, or from the brightening agent (a) of Example 2 by reaction with phosphorus pentachloride in phosphorus oxychloride.

EXAMPLE 11

A fabric of polyester fibres is padded with an aqueous liquor containing per litre 1 g. of a commercial wetting agent, 2 g. of a commercial dispersing agent and 1 g. of the brightening agent of the formula

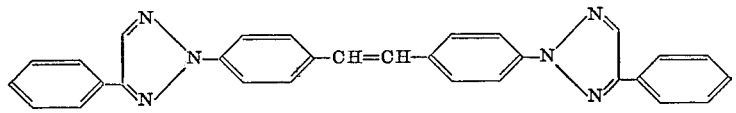

The fabric is then squeezed off so as to achieve an increase in weight of 100% and then dried and heated to 190–200° C. for 1 minute. As compared with untreated fabric, the fabric thus treated exhibits a strong brightening effect of very good fastness to light.

The brightening agent employed is prepared by condensation of 4,4'-dihydrazino - stilbene - dihydrochloride with oximino acetophenone and dehydration of the resultant bis-α-oximinohydrazone. The brightening agent can also be prepared by condensation of 4,4'-dihydrazino-dibenzyl with oximino acetophenone, dehydration of the resultant bis-α-oximino hydrazone with dehydration agents, such as sulphur, palladium and oxygen.

What is claimed is:
1. A compound of the formula

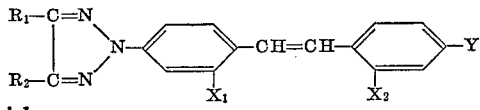

in which
R₁ is a member selected from the group consisting of a hydrogen, alkyl of 1–4 carbon atoms, carboxy ethyl, phenyl and sulphophenyl;
R₂ is a lower alkyl, naphthyl, sulfonaphthyl or

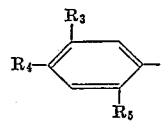

wherein
R₃ is a member selected from the group consisting of hydrogen, sulfo, chloro, carboxy, methoxy, and carboxymethoxy;
R₄ is a member selected from the group consisting of a hydrogen, alkyl of 1–4 carbon atoms, chloro, fluoro, alkoxy containing 1–4 carbon atoms, carboxy, sulfo, phenyl and carboxymethoxy;
R₅ is a member selected from the group consisting of hydrogen, methyl, methoxy and chloro;

R₁ in combination with R₂ together with the two ring carbons of the triazole moiety being further defined as a cyclohexyl moiety and

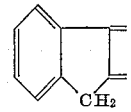

X₁ and X₂ are independently defined as members selected from the group consisting of a hydrogen, sulfonic acid group, alkyl sulfonamido, sulfonic acid methoxy alkylamide having an alkyl group of up to 2 carbon atoms, sulphonic acid carboxy alkyl amide having an alkyl group of up to 3 carbon atoms, sulphonic acid cyclohexylamide, sulfonic acid morpholide, sulphonic acid phenyl ester, sulphonic acid lower alkylphenyl ester having up to 4 carbon atoms in the alkyl moiety and sulfonic acid halophenyl ester group; and
Y is a v-triazolyl - (2), pyrazolyl - (1), lower alkoxy benzoylamino, and a 1,3,5-triazinylamino-(2) having as individual substituents on the 4- and 6-position thereof a member selected from the group consisting of methoxy-lower alkoxy, sodium sulfophenylamino, and N-methyl-N-hydroxy lower alkylamino.

2. The compound of claim 1 wherein
R₁ is a member selected from the group consisting of phenyl, sodium-sulfophenyl, carboxy methoxy phenyl or carboxy phenyl;
R₂ is a member selected from the group consisting of hydrogen, methyl or phenyl;
X₁ and X₂ are individually members selected from the group consisting of sodium sulfo and sulfo; and
Y is a member selected from the group consisting of 4-phenyl-triazolyl-(2), 4-(p-sodium sulfophenyl)-triazolyl-(2), 4-phenyl-5-methyl-triazolyl-(2), 4 - (p-sodium sulfophenyl)-5-methyl-triazolyl-(2),

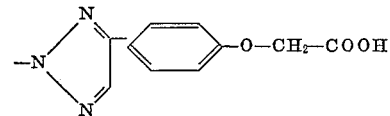

4 - (m-carboxyphenyl) - 5 - methyl triazolyl - (2) and 4,5-diphenyl-triazolyl-(2).

3. The compound of claim 1 wherein R₁ is phenyl; R₂ is hydrogen; X₁ and X₂ are —SO₃Na; and Y is 4-phenyl-triazolyl-(2).

4. The compound of claim 1 wherein R₁ is

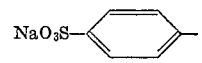

R₂ is hydrogen; X₁ and X₂ are NaSO₃— and Y is 4-(p-sodium sulfophenyl)-triazolyl-(2).

5. The compound of claim 1 wherein R₁ is phenyl; R₂ is methyl; X₁ and X₂ are —SO₃Na and Y is a 4-phenyl-5-methyl-triazolyl-(2).

6. The compound of claim 1 where R₁ is p-sodiumsulfophenyl; $R_2$ is methyl; $X_1$ and $X_2$ are —$SO_3Na$ and Y is 4-(p-sodium sulfophenyl)5-methyl triazolyl-(2).

7. The compound of claim 1 wherein the Y radical is v-triazolyl-2 having the $R_1$ and $R_2$ groups as substituents.

8. The compound of claim 1 wherein the Y radical is v-triazolyl-2 having the $R_1$ and $R_2$ groups as substituents and $X_1$ and $X_2$ are defined as sodium sulfo.

References Cited

UNITED STATES PATENTS 2,901,476  8/1959  Gold et al. _____ 260—240

FOREIGN PATENTS 787,429  12/1957  Great Britain.

JOHN D. RANDOLPH, Primary Examiner

U.S. Cl. X.R.

106—176; 117—33.5; 252—117, 152, 301.2; 260—37, 78, 78.4, 88.7, 92.8, 247.1, 456, 465, 471, 508, 556, 558, 566, 569